US009783166B1

(12) United States Patent
Brown et al.

(10) Patent No.: US 9,783,166 B1
(45) Date of Patent: Oct. 10, 2017

(54) WINDSCREEN CLEARING USING SURFACE MONITORING

(71) Applicant: International Business Machines Corporation, Armonk, NY (US)

(72) Inventors: Michael S. Brown, Wahroonga (AU); Stefan Harrer, Hampton (AU); Laurence J. Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/175,716

(22) Filed: Jun. 7, 2016

(51) Int. Cl.
| | | |
|---|---|---|
| *B60S 1/48* | (2006.01) | |
| *B60S 1/54* | (2006.01) | |
| *B60R 16/02* | (2006.01) | |
| *B60R 1/00* | (2006.01) | |
| *G06K 9/00* | (2006.01) | |

(Continued)

(52) U.S. Cl.
CPC ............... *B60S 1/481* (2013.01); *B60R 1/00* (2013.01); *B60R 16/0231* (2013.01); *B60S 1/54* (2013.01); *G06K 9/00832* (2013.01); *G06K 9/6201* (2013.01)

(58) Field of Classification Search
CPC ........ B60S 1/481; B60S 1/54; B60R 16/0231; B60R 1/00; G06K 9/00832; G06K 9/6201
See application file for complete search history.

(56) References Cited

U.S. PATENT DOCUMENTS

| | | | | |
|---|---|---|---|---|
| 1,653,176 A | | 12/1927 | Herman | |
| 2,312,187 A | * | 2/1943 | Patterson | ................ B60S 1/52 239/284.1 |

(Continued)

FOREIGN PATENT DOCUMENTS

| | | | | |
|---|---|---|---|---|
| BR | WO 2013091058 A1 | * | 6/2013 | ............... B60S 1/54 |
| DE | 2707310 A1 | * | 8/1978 | ............... B60S 1/48 |

(Continued)

OTHER PUBLICATIONS

"Windshield Wiper Alternatives?" The Straight Dope Message Board, http://boards.straightdope.com/sdmb/showthread.php?t=57069, Jan. 24, 2001, downloaded Jan. 9, 2016, pp. 1-5.

(Continued)

*Primary Examiner* — Rodney Butler
(74) *Attorney, Agent, or Firm* — Scully, Scott, Murphy & Presser, P.C.; John Pivnichny (57) ABSTRACT

Methods, systems and computer readable program products for maintaining windscreen visibility using surface monitoring are disclosed. In embodiments, the system comprises a set of sensors for monitoring a state of a windscreen surface and for generating one or more signals representing that state; a control system for analyzing the one or more signals to identify defined conditions of the surface of the windscreen and to generate one or more control signals; and a set of activatable devices for receiving the one or more control signals. The control signals activate the activatable devices to remove the identified conditions of the surface of the windscreen. In embodiments, the set of activatable devices includes air jets and cleaning fluid jets, and the control signals activate these jets to direct air and cleaning fluids onto the windscreen. This may be done to remove rain drops or dirt from the windscreen.

20 Claims, 3 Drawing Sheets

(51) Int. Cl.
*G06K 9/62* (2006.01)
*B60R 16/023* (2006.01)

(56) References Cited

U.S. PATENT DOCUMENTS

| | | | |
|---|---|---|---|
| 5,486,139 | A | 1/1996 | Papp |
| 7,946,505 | B2 | 5/2011 | Lynam et al. |
| 8,098,171 | B1 | 1/2012 | Szczerba et al. |
| 8,903,121 | B2 | 12/2014 | Heenan et al. |
| 8,994,520 | B2 | 3/2015 | Stählin et al. |
| 2001/0028234 | A1* | 10/2001 | Banhidy ............... B60S 1/0818 318/483 |
| 2002/0105439 | A1* | 8/2002 | Kiridena ................ B60R 1/00 340/905 |
| 2009/0017743 | A1 | 1/2009 | Raghuprasad |
| 2010/0230991 | A1* | 9/2010 | Fioravanti .............. B60J 1/2005 296/96.15 |
| 2014/0267775 | A1* | 9/2014 | Lablans ................. H04N 5/247 348/169 |
| 2014/0321701 | A1* | 10/2014 | Halimeh ............... B60S 1/0844 382/103 |
| 2015/0066293 | A1* | 3/2015 | Davies ................. B60S 1/0862 701/36 |
| 2015/0294169 | A1* | 10/2015 | Zhou ........................ A61B 5/18 348/148 |
| 2016/0031372 | A1* | 2/2016 | Stein .................... B60Q 1/0023 348/148 |

FOREIGN PATENT DOCUMENTS

| | | | | | |
|---|---|---|---|---|---|
| DE | | 3803491 | A1 * | 8/1989 | ............. B60S 1/481 |
| DE | | 10011840 | A1 * | 10/2001 | ............ B60S 1/0402 |
| DE | WO | 2012032188 | A2 * | 3/2012 | ................ B60S 1/52 |
| DK | WO | 2016177380 | A1 * | 11/2016 | ................ B60S 1/54 |
| JP | | 2015039950 | A * | 3/2015 | |
| WO | | 2006/060868 | A2 | 6/2006 | |

OTHER PUBLICATIONS

"Next-Gen Windshield Wipers to Be Based on Jet Fighter "Forcefield" Tech", https://tech.slashdot.org/story/13/12/16/1529230/next-gen-windshield-wipers-to-be-based-on-jet-fighter-forcefield-tech, Dec. 16, 2013, downloaded Jan. 9, 2016, pp. 1-15.

Estes, "McLaren Is Using Fighter Jet Technology for Wiper-free Windshields", http://gizmodo.com/mclaren-is-using-fighter-jet-technology-for-wiper-free-1484213049, Dec. 16, 2013, downloaded Jan. 9, 2016, pp. 1-2.

Bonsor et al., "How Nanotechnology Works", http://science.howstuffworks.com/nanotechnology3.htm, downloaded Jan. 9, 2016, pp. 1-10.

"Self-cleaning glass", Wikipedia, https://en.m.wikipedia.org/wiki/Self-cleaning_glass, downloaded Jan. 9, 2016, pp. 1-4.

George et al., "DAARIA: Driver Assistance b Augmented Reality for Intelligent Automobile", IEEE Intelligent Vehicles Symposium, Jun. 2012, Spain, https://hal-univ-tlse3.archives-ouvertes.fr/hal-00733246/document, pp. 1043-1048.

Elahi et al., "Intelligent windshield for automotive vehicles", Computer and Information Technology (ICCIT), 2014 17th International Conference on, Dec. 22-23, 2014, http://ieeexplore.ieee.org/xpl/login.jsp?tp=&arnumber=7073112&url=http%3A%2F%252, pp. 392-396.

Alazzawi et al., "Design an Implementation of a Reconfigurable Automatic Rain Sensitive Windshield Wiper", International Journal of Engineering & Technology Sciences, Apr. 2015, vol. 8, Issue 2, https://www.researchgate.net/publication/275643772_DESIGN_AND_IMPLEMENTATION_OF_A_RECONFIGURABLE_AUTOMATIC_RAIN_SENSITIVE_WINDSHIELD_WIPER, pp. 73-82.

Matsumaru et al., "Windshield cleaning robot system", Intelligent Robots and Systems '94. 'Advanced Robotic Systems and the Real World', IROS'94, Proceedings of teh IEEE/RSJ/GI Internationl Conference on, http://ieeexplore.ieee.org/xpl/login.jsp?tp=&arnumber=407594&url=http%3A%2F%2F, Sep. 12-16, 1994, pp. 1964-1971, vol. 3.

* cited by examiner

WINDSCREEN CLEARING USING SURFACE MONITORING

BACKGROUND

This invention generally relates to clearing vehicle windscreens.

Vehicles are often provided with one or more windscreen wipers to clean the windscreen. Typically, the wipers are rubber blades and, when activated, mechanical arms move the rubber blades across the surface of the windscreen. Often, a washer pump is provided to pump washer fluid, which may be water with detergent and antifreeze additives, onto the windscreen through nozzles.

Conventional windscreen wipers remain fundamentally unchanged in one hundred years. The rubber blades do not cover the full surface of the windscreen and they deteriorate over time. The windscreen wipers are placed at the base of the windscreen and are unsightly and cause fuel inefficiencies by creating drag. Also, the windscreen wipers do not detect or address specific marks on the windscreen.

SUMMARY

Embodiments of the invention provide methods, systems and computer readable program products for maintaining windscreen visibility using surface monitoring. In embodiments, the system comprises a set of sensors for monitoring a state of a surface of a windscreen of a vehicle, and for generating one or more signals representing said state; a control system for analyzing said one or more signals to identify defined conditions of the surface of the windscreen and to generate one or more control signals; and a set of activatable devices for receiving the one or more control signals from the control unit, the control signals activating the activatable devices to remove the identified defined conditions of the surface of the windscreen.

DETAILED DESCRIPTION

Detailed descriptions of specific embodiments of the vehicle windscreen cleaning systems and method of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the vehicles, windscreen cleaning systems, and methods described herein may be embodied in various and alternative forms. The figures are not necessarily to scale and some features may be exaggerated or reduced to show details of particular components. Well-known components, materials or methods are not necessarily described in detail in order to avoid obscuring the present disclosure. Any specific structural and functional details disclosed herein are not to be interpreted as limiting, but as a representative basis for teaching one skilled in the art to employ the invention.

Figure 1:
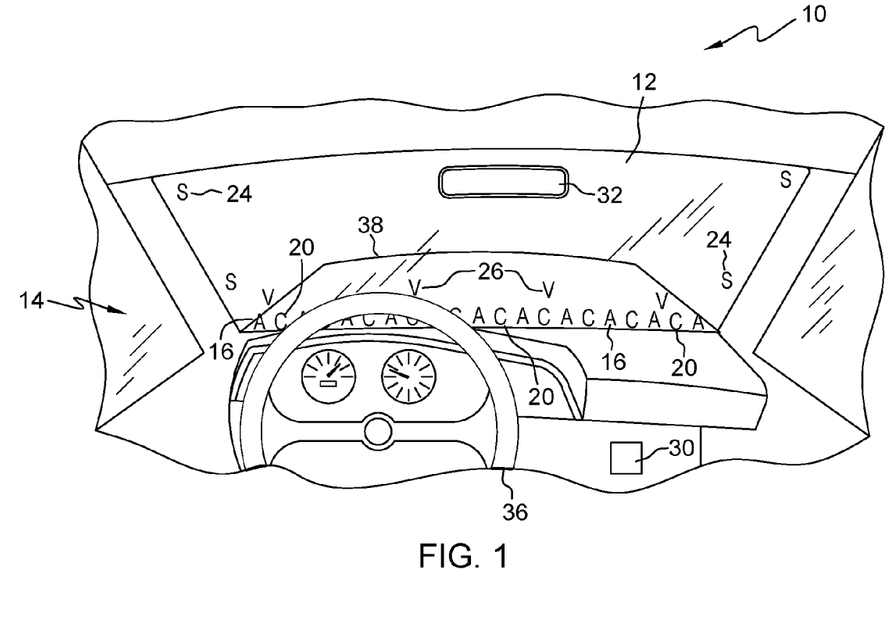
FIG. 1 is a view of a vehicle windscreen from the interior of the vehicle and showing a cleaning system of an embodiment of the invention.
Figure 2:
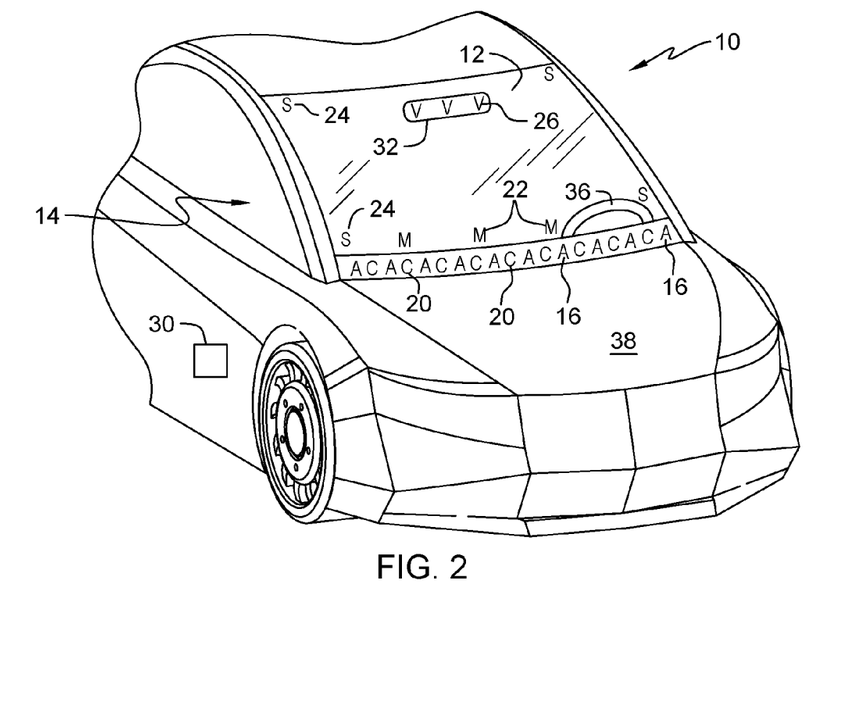
FIG. 2 is a view of the windscreen and cleaning system of FIG. 1 from the exterior of the vehicle.

FIGS. 1 and 2 illustrate a windscreen cleaning system 10 for a windscreen 12 of a vehicle 14 in accordance with an embodiment of the invention. Generally, in this embodiment, cleaning system 10 comprises a set of air jets 16, a set of cleaning jets 20, one or more mechanical arms 22, a group of sensors 24, one or more video cameras 26, and a processing unit 30. In FIGS. 1 and 2, the air-jets are represented at "a", the cleaning jets are represented at "c", the mechanical arms are represented at "m", the sensors are represented at "s", and the video cameras are represented at "v". FIGS. 1 and 2 also show a rear view mirror 32, a steering wheel 36 and a bonnet or front hood 38 of the vehicle.

In the embodiment of the invention shown in FIGS. 1 and 2, the set of air jets 16 are positioned at the base of the windscreen 12. The air jets are multi-directional and direct air under pressure to specific drops of water on the windscreen. The cleaning jets 20 are multidimensional soap and water jets and are also positioned at the base of the windscreen. The soap jets direct cleaning agents to marks on the windscreen, and the water jets direct both hot and cold water to the marks on the windscreen.

Embodiments of the invention also include one or more video cameras 26 and real time video analysis capability. As discussed in more detail below, the one or more video cameras capture images of the windscreen surface, and a video analysis engine identifies when and where to direct the air jets and the soap and water jets.

In embodiments of the invention, when rain is on the windscreen 12, the rain is immediately detected, and the air jets 16 are directed to blow specific drops of water from the windscreen, effectively blowing and chasing the water drops from the surface. When marks such as dirt or insects are on the windscreen, these marks are immediately detected, and the soap and water jets 20 are directed to spray the cleaning agent and water in turn to the mark until the mark is removed from the windscreen or until the driver of the vehicle commands or directs the system to stop spraying from the jets.

Sensors 24 are provided to monitor the surface state of both the inside and outside of the windscreen 12. Sensors include resistive sensors, heat sensors, reflective sensors, polarization sensors and wind pressure sensors.

These sensors relay data to microprocessor 30, which determines actions to take. These actions may include, for instance, automatically defogging the window by using the controlled surface airflow to counteract temperature gradients across the windscreen, or to notify maintenance personnel that a crack in the windscreen has been detected.

It may be noted that the placement and the number of components shown in FIGS. 1 and 2 is illustrative, e.g., fewer components may be needed depending on capability, e.g., when the jets are more powerful, fewer jets are needed. Also, windscreen wipers are not shown in the figures. In embodiments of the invention, windscreen wipers used in cars today can optionally remain in place when this invention is deployed.

In addition, it may be noted that the windscreen itself may be more easily cleaned if it is comprised of self-cleaning glass with its surface coated in nano-particles.

To form a resistive sensor, a layer of a conductive material is encapsulated or applied to the surface of the windshield 12 forming patterns at selected positions of the windshield. Examples include but are not limited to gratings, line patterns, circular patterns. The electric sheet resistance of such conductive pattern layers is measured continuously through electrodes connected to the layer. Sheet resistance changes once patterns change (for example some pattern parts get destroyed when a rock hits the windshield), or once the surface properties of the patterns change (for example through dirt, water etc. deposition) or a combination of all of these. Conductive layer materials can be chosen to selectively respond to some surface alterations and not to others (example: light sensitive materials will react differently to non-transparent depositions—dirt—than to transparent depositions—water).

Heat sensors may be formed and operated the same as the resistive sensors described above, but the conductive properties, and thus the sheet resistance of the heat sensors, change depending on heat gradients across patterns and hence the windshield. Rain water deposition will induce a temperature gradient. This method is preferred for detecting isolated drops. In heavy rain, the temperature at the outside interface of the windshield and the rain water layer will level over time, diminishing heat gradients.

The reflective and polarization sensors are used to sense specific properties of light. Light is an electromagnetic wave comprised of components which are arranged in specific directions in space—this arrangement is called polarization of light. Polarized components of impending light can selectively be enhanced or eliminated by aligning electromagnetically active materials (for example conductors or water) with the polarization planes of the light. A polarization sensor, for the purpose of embodiments of this invention, will utilize this filtering effect to allow light to reach a photoactive layer in the windshield when the sensor is disabled or destroyed. As an example, a polarization foil can be applied to parts of the windshield covering photo-sensitive pads underneath—preferably encapsulated within the windshield or on the inside surface of the windshield, and once the foil gets scratched, pinched or destroyed in any other way, light will reach the photo sensitive pads and the sensor will register an alarm.

Embodiments of the invention use two preferred implementations of wind pressure sensors: (1) resistive sensors; and (2) piezo sensors. The resistive sensors may be formed and operated as discussed above, with sheet resistance changing due to elongation or compression of patterns. One implementation would be resistive sensor patterns in the form of four lines stretching along both diagonals of the windshield with two lines sitting on top of each other, one on the outside and one on the inside of the windshield, aligned on top of each other. This arrangement measures the difference in sheet resistance between the two parallel lines for each diagonal. Even a slight pressure deformation of the windshield will translate in a change of the difference in sheet resistances (outside line will be compressed, i.e. become shorter, inside line will be elongated, i.e. become longer).

Piezo sensors may also be used to sense wind pressure. A piezoelement stretches, for example, along the diagonal of the windshield. Deformation of the piezosensor through wind pressure results in an electric pulse which can be measured. This could also be used to measure windshield vibrations in real time (vibration patterns will be directly translated into electric signal patterns) and an analytical system can be trained to sense or identify on unusual features in the vibration pattern (which may be considered or referred to as "seismic" activity on the windshield).

The sensors may operate either individually or in a concerted fashion. For example, combining a resistive sensor and a polarization sensor measurement will increase the confidence level for determining a crack/rock pinch, ruling out a water drop. If the piezoelectric sensor picks up an impact at the same time, it can safely be determined that an object has hit the windshield and cracked it. Similarly, combining all sensor inputs can lead to increased confidence levels for identifying dirt or water on the windshield.

In embodiments of the invention, video cameras 26 inside and outside the vehicle focus on the windscreen and capture motion images of the windscreen as the car is being driven. Associated with the video cameras are one or more microprocessors 30 which execute video image analysis and pattern matching algorithms. As there are video cameras pointed at the windscreen from both inside the car, the dirt on the windscreen is seen from two different angles. Video images do not need to be stored. Video cameras 30 may be recessed into the hood or bonnet or in the dashboard or in the rear vision mirror in order to be less visually apparent.

A rules engine determines confidence levels for identifying a specific object based on collating sensor outputs as described above (Sensor interaction) and combining them with the results of pattern matching and spatial logic. Data from the sensors 24 is relayed to the microprocessor 30 which runs the logic, e.g., a rules system to determine what actions to take based on what input from the sensors and the analytical engine.

The microprocessor 30 connects to the sensors 24 and the video cameras 26 and processes information received from these components. The programming logic comprises: Image analysis; Pattern recognition; Calculation of object or mark (x, y) coordinates and size; Rules to identify what action to take in what circumstances, e.g., when safe to do so; and Relaying of commands to agents which take action, e.g., the air jets.

Figure 3:
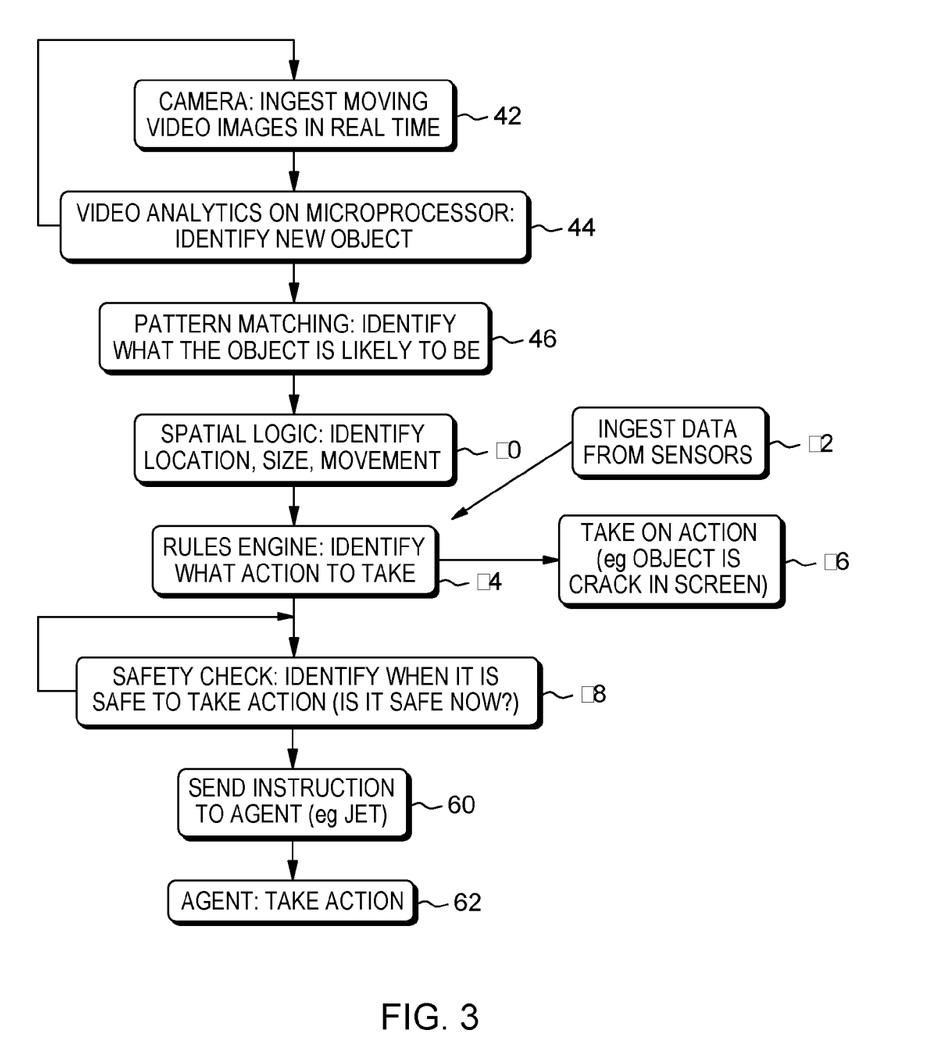
FIG. 3 is a flow chart showing a procedure for capturing and analyzing images of the windscreen surface.

FIG. 3 illustrates an embodiment of programming logic that may be used in the present invention.

At step 42, the video cameras 24 inside and outside the vehicle 14 capture motion images of the windscreen 12 as the vehicle is being driven. At step 44, video analytics on the microprocessor 30 identify new objects. As each frame of video arrives, the algorithm identifies differences between the current frame and earlier frames. The algorithms reject changes which are transient, e.g., a passing reflection, and identify changes which remain in subsequent frames, as these changes represent possible objects (e.g., dirt or water) on the windscreen.

Pattern matching is used, at step 46, to identify what the object is likely to be. For instance, pattern matching is applied to identify whether the object is likely to be water (i.e., rain) or dirt.

At step 50, other characteristics of the object are calculated, e.g., size, location, whether the object is moving. Also, as represented at 52, sensors 24 may register that the object is a new crack in the windscreen.

This information is used, at 54, to determine what action to take, e.g., direct air jets if the object is water, or cleaning jets comprising water and cleaning fluid if the object is dirt.

As represented at 56, the information may indicate that no action should be taken. For instance, if the data input shows that an object on the windscreen is a crack in the windscreen, the air and cleaning jets are not used to direct water or the cleaning fluid to the mark.

If an action is identified, then, at step 58, a safety check is made to identify when it is safe to take the action. This determination may be made based on pre-identified rules.

At step 60, instructions are sent to an agent such as one of the air or cleaning fluid jets to activate the jet. At step 62, in response to receiving these instructions, the agent is activated to take the requested action.

In embodiments of the invention, rain is recognized by the analysis engine, as the analysis engine has been trained with a large body of precedent video images to recognize what water looks like on the windscreen as the water moves when the car is in motion and when the car stops. The image captured by the video camera includes a known fixed location such as the steering wheel or the rear vision mirror and the distance and direction from the known fixed location to the drops is calculated, enabling the (x,y) coordinates of the drops on the surface of the windscreen to be calculated. These coordinates are relayed to the high pressure air jets located on the exterior of the car and the jets are directed at the drops. Movement of objects is detected by doing a comparison of object location across successive video frames.

Marks such as dirt or insects are recognized by the image analytics system, and the location and size of the marks are identified using the same approach discussed above for identifying the location of rain drops. The system relays the coordinates and size of the mark to the cleaning jets which attempt to remove the mark.

The video analytics system monitors progress with removing the mark, and if the mark remains after the cleaning jets have been invoked, a mechanical arm may be then invoked when safe to do so.

In embodiments of the invention, the window cleaning system 10 operates continuously when the car engine is engaged. The video cameras 26 continuously capture moving images which are relayed to the microprocessor 30 for analysis.

As an example, a few drops of rain land on the windscreen as the car is in motion. As with any car, the forward movement of the car creates air pressure which causes the drops to move across the windscreen. The analytics engine has analyzed the live video feeds and recognized there are objects on the screen. The pattern matching engine recognizes the objects as rain drops and in real time calculates their location. The rules system is invoked to determine what steps to take, and the rule for rain drops is to use the air jets, so the coordinates for the rain drops are relayed to the air jets which direct high pressure jets or air at the drops, causing the water to disperse. As a real time system, video is continuously ingested and analyzed with further coordinates being relayed to the air jets. As the rain becomes heavier, the system continues to function, recognizing where the drops are located and dispersing them. This continues whether the car is in motion or stationary. In heavy rain, the traditional windscreen wipers, if present, can be invoked.

As another example, an insect has hit the windscreen and the image of the resulting mark is captured by the video camera, and the images are analyzed by the analytics engine and recognized to be a new mark and likely to be an insect. The rule system is invoked and the rule for insect marks is to use the cleaning jets when safe to do so. The system reads data collected by the vehicle including the speed of the vehicle and the amount of traffic and, when deemed safe (e.g., when the vehicle is stopped at traffic lights), the location of the mark is sent to the cleaning jets which attempt to remove the mark by spraying cleaning agent and water in succession at the mark.

Figure 4:
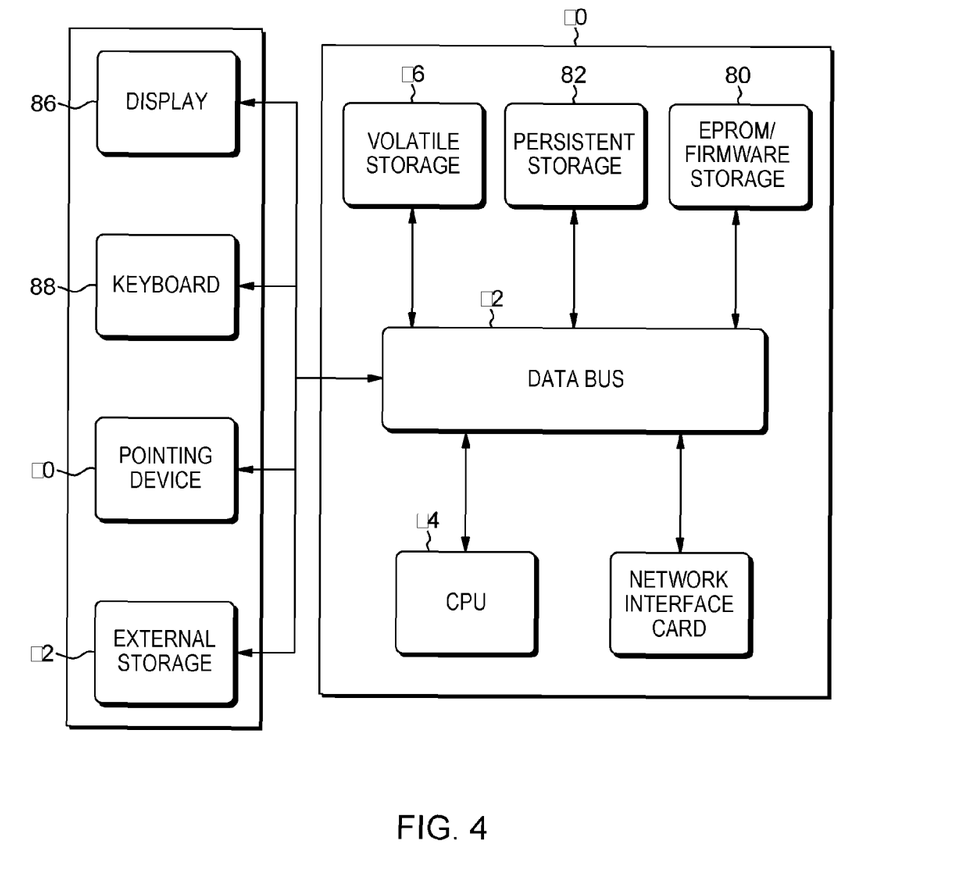
FIG. 4 is a schematic view of a processor unit that may be used in the cleaning system of FIGS. 1 and 2.

Any suitable processing unit 30 may be used in embodiments of the invention. FIG. 4 is a block diagram that illustrates an embodiment of a processing unit 70 that may be used in the present invention.

The processing unit 70 may include a data bus 72 or other communication mechanism for communicating information across and among various parts of the processing unit 70, and a central processor unit (CPU) 74 coupled with bus 72 for processing information and performing other computational and control tasks. Processing unit 70 also includes a volatile storage 76, such as a random access memory (RAM) or other dynamic storage device, coupled to bus 72 for storing various information as well as instructions to be executed by the CPU 74. The volatile storage 76 also may be used for storing temporary variables or other intermediate information during execution of instructions by CPU 74.

Processing unit 70 may further include a read only memory (ROM or EPROM) 80 or other static storage device coupled to bus 72 for storing static information and instructions for CPU 74, such as basic input-output system (BIOS), as well as various system configuration parameters. A persistent storage device 82, such as a magnetic disk, optical disk, or solid-state flash memory device is provided and coupled to bus 72 for storing information and instructions.

Processing unit 70 may be coupled via bus 72 to a display 84, such as a cathode ray tube (CRT), plasma display, or a liquid crystal display (LCD), for displaying information to a system administrator or user of the processing unit 70. An input device 86, including alphanumeric and other keys, may be coupled to processing unit 70 for communicating information and command selections to CPU 74. Another type of user input device is cursor control device 90, such as a mouse, a trackball, or cursor direction keys for communicating direction information and command selections to processor 70 and for controlling cursor movement on display 84. This input device typically has two degrees of freedom in two axes, a first axis (e.g., x) and a second axis (e.g., y), that allows the device to specify positions in a plane.

An external storage device 92 may be connected to the processing unit 70 to provide an extra or removable storage capacity for the processing unit. In an embodiment of the processing unit 70, the external removable storage device 92 may be used to facilitate exchange of data with other computer systems.

The processing unit 70 also includes a communication interface, such as network interface 94 coupled to the data bus 72. Communication interface 94 provides a two-way data communication coupling to a network link 96. Network link 96 typically provides data communication through one or more networks to other network resources. For example, network link 96 may provide a connection through a local network to a host computer, or to a network storage/server. Additionally or alternatively, the network link 96 may connect to the wide-area or global network, such as an Internet. Thus, the processing unit 70 can access network resources located anywhere on the Internet, such as a remote network storage/server. In addition, the processing unit may also be accessed by clients located anywhere on the local area network and/or the Internet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A system for maintaining windscreen visibility using surface monitoring, the system comprising:
    a set of sensors for monitoring a state of a surface of a windscreen of a vehicle, and for generating one or more signals representing said state;
    a control system for analyzing said one or more signals to identify defined conditions of the surface of the windscreen and to generate one or more control signals; and a set of activatable devices for receiving the one or more control signals from the control unit, the control signals activating the activatable devices to remove the identified defined conditions of the surface of the windscreen; and wherein:

the set of activatable devices includes a plurality of different types of the activatable devices;

a given set of rules is provided for determining when to activate the different types of the activatable devices; and the control system analyzes said one or more signals generated by the set of sensors to determine which one or more of the different types of the activatable devices to activate based on said given set of rules.

2. The system for maintaining windscreen visibility according to claim 1, wherein:

the set of activatable devices includes a set of fluid dispensers for directing one or more fluids onto the windscreen; and the control signals activate the fluid dispensers to direct the one or more fluids onto the windscreen to remove the identified defined conditions on the surface of the windscreen.

3. The system for maintaining windscreen visibility according to claim 2, wherein:

the identified defined conditions on the surface of the windscreen include defined types of marks on the windscreen;

the control system determines spatial coordinates for the defined marks on the windscreen; and the control signals activate the fluid dispensers to direct the one or more fluids to the determined spatial coordinates for the defined marks on the windscreen.

4. The system for maintaining windscreen visibility according to claim 1, wherein:

the set of sensors include one or more video cameras to capture images of the windscreen;

the one or more video cameras send video frames to the control system; and as the control system receives the video frames, the control system identifies differences between a current one of the video frames and an earlier one of the video frames.

5. The system for maintaining windscreen visibility according to claim 4, wherein the control system rejects ones of the differences that are identified as transient.

6. The system for maintaining windscreen visibility according to claim 1, wherein the control system uses pattern matching to identify each of the identified defined conditions as being one of a given group of types.

7. The system for maintaining windscreen visibility according to claim 1 wherein:

the set of sensors include one or more video cameras to capture images of the windscreen;

the one or more video cameras send video frames to the control system;

the identified defined conditions include one or more objects on the windscreen; and the control system detects movement of the one or more objects by doing a comparison of object location across successive ones of the video frames.

8. The system for maintaining windscreen visibility according to claim 1, wherein:

the set of activatable devices include a plurality of air jets for directing air onto the windscreen;

the identified defined conditions include rain drops on the windscreen; and the control signals activate the air jets to direct the air onto the windscreen to remove the rain drops from the windscreen.

9. The system for maintaining windscreen visibility according to claim 1, wherein:

the set of activatable devices includes a plurality of cleaning jets for directing cleaning fluid onto the windscreen;

the identified defined conditions includes a dirt mark on the windscreen; and the control signals activate the cleaning jets to direct the cleaning fluid onto the windscreen to remove the dirt mark from the windscreen.

10. The system for maintaining windscreen visibility according to claim 1, wherein:

the set of sensors includes one or more resistance sensors on the windscreen and to generate signals representing electric resistance across the resistance sensors to detect specified surface properties of the windscreen, and one or more heat sensors to detect temperature gradients across portions of the windscreen;

the given set of rules is provided to specify times at which the activatable devices are allowed to be activated; and the control signals active the activatable devices only at the times allowed by the given set of rules.

11. A method for maintaining windscreen visibility using surface monitoring, the method comprising:

monitoring a state of a surface of a windscreen of a vehicle, and generating one or more signals representing said state;

analyzing said one or more signals to identify defined conditions of the surface of the windscreen and to generate one or more control signals; and activating a set of activatable devices, using said one or more control signals, to remove the identified defined conditions of the surface of the windscreen; and wherein:

the set of activatable devices includes a plurality of different types of the activatable devices;

a given set of rules is provided for determining when to activate the different types of the activatable devices; and the analyzing said one or more signals representing said state of the surface of the windscreen includes analyzing said one or more signals representing said state to determine which one or more of the different types of the activatable devices to activate based on said given set of rules.

12. The method according to claim 11, wherein the activating a set of activatable devices includes activating a plurality of fluid dispensers to direct one or more fluids onto the windscreen to remove the identified defined conditions on the surface of the windscreen.

13. The method according to claim 12, wherein:

the identified defined conditions on the surface of the windscreen include defined types of marks on the windscreen;

the analyzing said one or more signals to identify defined conditions on the surface of the windscreen includes determining spatial coordinates for the defined marks on the windscreen; and the activating a set of activatable devices includes activating the fluid dispensers to direct the one or more fluids to the determined spatial coordinates for the defined marks on the windscreen.

14. The method according to claim 12, wherein:
the identified defined conditions includes a dirt mark on the windscreen; and
the activating a plurality of fluid dispensers to direct one or more fluids onto the windscreen activating one or more cleaning jets to direct cleaning fluid onto the dirt mark on the windscreen;
the activating a set of activatable devices further includes activating a mechanical arm to brush said dirt mark to remove the dirt mark from the windscreen.

15. The method according to claim 11, wherein:
the given set of rules is provided to specify times at which the activatable devices are allowed to be activated; and
the activating a set of activatable devices includes activating the activatable devices only at the times allowed by the given set of rules.

16. A computer program product comprising:
a computer readable storage medium having computer program code tangibly embodied therein for maintaining windscreen visibility using surface monitoring, the computer program code, when executed in a computer system performing the following:
receiving one or more signals representing the monitored state of a surface of a windscreen of a vehicle;
analyzing said one or more signals to identify defined conditions of the surface of the windscreen and to generate one or more control signals; and
activating a set of activatable devices, using said one or more control signals, to remove the identified defined conditions of the surface of the windscreen; and wherein:
the set of activatable devices includes a plurality of different types of the activatable devices;
a given set of rules is provided for determining when to activate the different types of the activatable devices; and
the analyzing said one or more signals representing the monitored state of the surface of the windscreen includes analyzing said one or more signals representing said state to determine which one or more of the different types of the activatable devices to activate based on said given set of rules.

17. The computer program product according to claim 16, wherein the activating a set of activatable devices includes activating a plurality of fluid dispensers to direct one or more fluids onto the windscreen to remove the identified defined conditions on the surface of the windscreen.

18. The computer program product according to claim 17, wherein:
the identified defined conditions on the surface of the windscreen include defined types of marks on the windscreen;
the analyzing said one or more signals to identify defined conditions on the surface of the windscreen includes determining spatial coordinates for the defined marks on the windscreen; and
the activating a set of activatable devices includes activating the fluid dispensers to direct the one or more fluids to the determined spatial coordinates for the defined marks on the windscreen.

19. The computer program product according to claim 16, wherein:
the one or more signals includes a succession of video frames of images of the windscreen;
the identified defined conditions include one or more objects on the windscreen; and
the analyzing said one or more signals to identify defined conditions on the surface of the windscreen includes detecting movement of the one or more objects by doing a comparison of object location across successive ones of the video frames.

20. The computer program product according to claim 16, wherein:
the given set of rules is provided to specify times at which the activatable devices are allowed to be activated; and
the activating a set of activatable devices includes activating the activatable devices only at the times allowed by the given set of rules.

* * * * *